United States Patent [19]
Kuhr et al.

[11] Patent Number: 5,234,042
[45] Date of Patent: * Aug. 10, 1993

[54] TREAD DESIGN FOR A PNEUMATIC VEHICLE TIRE

[75] Inventors: Wolfgang Kuhr; Nobert Zinnen, both of Aachen, Fed. Rep. of Germany

[73] Assignee: Uniroyal Englebert Reifen GmbH, Aachen, Fed. Rep. of Germany

[*] Notice: The portion of the term of this patent subsequent to Oct. 13, 2009 has been disclaimed.

[21] Appl. No.: 669,117

[22] Filed: Mar. 12, 1991

[30] Foreign Application Priority Data

Mar. 12, 1990 [DE] Fed. Rep. of Germany ....... 9002986

[51] Int. Cl.$^5$ .............................................. B60C 11/11
[52] U.S. Cl. .................................................. 152/209 R
[58] Field of Search .............. D12/146, 147, 149, 151; 152/209 R, 209 B, 209 D

[56] References Cited

U.S. PATENT DOCUMENTS

| | | | |
|---|---|---|---|
| 4,687,037 | 8/1987 | Pfeiffer et al. | 152/209 R |
| 4,722,378 | 2/1988 | Carolla et al. | 152/209 R |

FOREIGN PATENT DOCUMENTS

| | | | |
|---|---|---|---|
| 0614574 | 5/1935 | Fed. Rep. of Germany ... | 152/209 R |
| 0169305 | 9/1985 | Japan .............................. | 152/209 D |
| 0291204 | 12/1986 | Japan .............................. | 152/209 R |

OTHER PUBLICATIONS

"Die Ganz andere Problemlösung"; Produkte, Oct. 1990.

"Der Reifen, Der Nicht Baden Geht"; Auto Bild; Oct. 22, 1990.

*Primary Examiner*—Michael W. Ball
*Assistant Examiner*—Nancy T. Krawczyk
*Attorney, Agent, or Firm*—Robert W. Becker & Associates

[57] ABSTRACT

A tread design for a pneumatic tire of radial construction for high-speed vehicles is provided. The tire has a height-to-width ratio of $\leq 0.6$ with a tread design that is tied to the direction of rotation. The tread design comprises profiled elements that are steeply oriented in the circumferential direction at an angle to the equatorial plane of the tire and are arranged in the shape of V's. The profiled elements extend from a central portion of the tread into shoulder regions of the tire, with the profiled elements being angled-off at a bend region in the shoulder regions in the direction of an axis of the tire. Respective continuous inclined grooves that proceed from the central portion to the shoulder regions are formed between the profiled elements. A circumferentially extending rib is disposed in the equatorial plane and forms two central, circumferentially extending grooves, one on each side of the rib, between this rib and starting portions of the profiled elements. The inclined grooves communicate with these circumferential grooves. In the central portion of the tread, the profiled elements extend at an angle of from 5° to 30° relative to the equatorial plane, while in the shoulder regions, proceeding from the bend regions, the profiled elements extend at an angle of from 65° to 85°. The shoulder regions have a forked configuration.

9 Claims, 4 Drawing Sheets

TREAD DESIGN FOR A PNEUMATIC VEHICLE TIRE

BACKGROUND OF THE INVENTION

The present invention relates to a tread design for a pneumatic tire of radial construction for high-speed vehicles, with the tire having a height-to-width ratio of ≦0.6. These vehicle tires have a belt-reinforced tread portion with a tread design that is tied to the direction of rotation. The tread design comprises profiled elements that are steeply oriented in the circumferential direction at an angle to the equatorial plane of the tire and are arranged in the shape of V's. The profiled elements extend from a central portion of the tread design into shoulder regions of the tire, with the profiled elements being angled-off at a bend region in the shoulder regions in a direction that is more or less parallel to the axis of the tire. Respective continuous inclined grooves are formed between the profiled elements and proceed from the central portion of the tread design to the open shoulder regions.

A tread design of this general type is known from U.S. Pat. No. 4,687,037; the tread surfaces of such pneumatic vehicle tires are relatively wide. The wide circumferential groove that is provided, and the number of inclined grooves formed by inclined profiled elements, ensure that the aquaplaning that is more feared with wide tires than with normal tires under similar water depth conditions is effectively avoided and that water that is present can still be effectively removed from the ground support surface even when locking of the wheels occurs during full braking. The heretofore known tread design has a wide circumferential groove and wide profiled element ends that delimit this groove. Unfortunately, at high vehicle speeds this results in a high rate of wear and a high generation of noise.

It is therefore an object of the present invention to provide a tread design of the aforementioned general type where the profiled elements are disposed as steeply as possible in order to ensure great drainage due to the steeply oriented inclined grooves, and in order not only in the central region but also in the shoulder regions to provide a positive profile in order to keep the wear and the generation of noise relatively slight.

The tread design can, in place of the profiled elements, also be provided with profiled grooves that are delimited by profiled elements.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
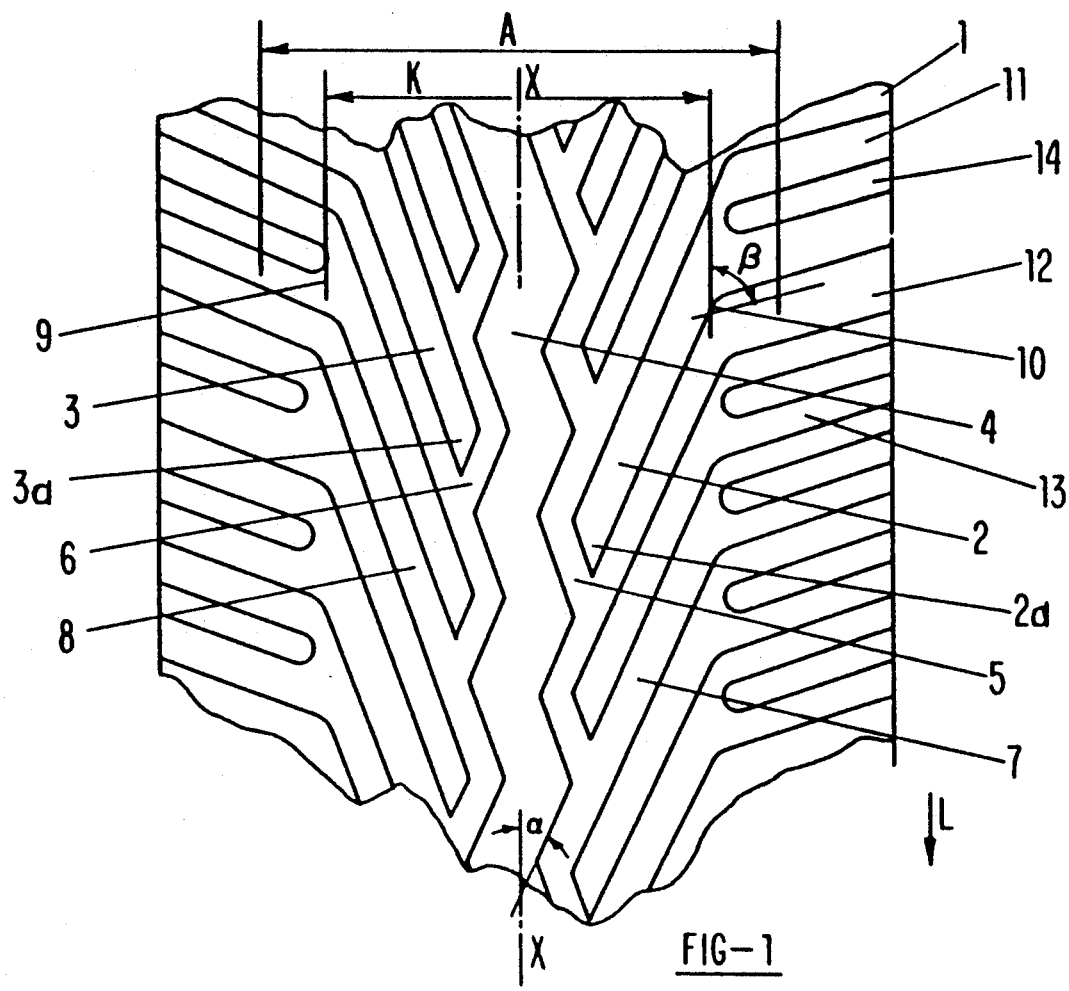
FIG. 1 shows one exemplary embodiment of the inventive tread design, which is formed from profiled elements that are arranged in the shape of V's, with a shoulder bend and a central zig-zagged rib.

The tread design of the present invention is characterized primarily by: A circumferentially extending rib that is disposed in the equatorial plane of the tire and is spaced from starting portions of the profiled elements which are essentially rune-shaped, so as to form two central, circumferentially extending grooves, one on each side of the circumferentially extending rib, between this rib and the starting portions of the profiled elements, with the inclined grooves that are formed between the profiled elements communicating with the circumferentially extending grooves; in the central portion of the tread design, the profiled elements extend at an angle of from 5° to 30° relative to the equatorial plane; in the shoulder regions, proceeding from the bend regions, the profiled elements extend at an angle of from 65° to 85° relative to the equatorial plane; and the shoulder regions have a forked configuration.

The terminology "forked configuration" as used in this application means that the shoulder regions, in the vicinity of the ends of the profiled elements remote from the central portion of the tread, are provided with respective portions comprising a plurality of ribs and grooves, including at least one blind groove, with these ribs and grooves alternating in a circumferential direction, thereby producing respective ribbed, tined or fork-shaped configurations in the shoulder regions.

The central circumferential rib, which can have a zig-zagged or linear configuration, ensures that the tire is very resistant to wear in the central portion, and that the generation of noise as a consequence of the profiling is relatively slight. In addition, the central circumferential rib ensures that the two central circumferential grooves formed thereby are in a position to always prevent aquaplaning conditions; this is the case because these two circumferential grooves communicate with relatively steeply oriented lined grooves that make it possible for water that is present to easily flow off at any time. The rune-shaped profiled elements have a central portion that is oriented relatively steeply in the circumferential direction, with the inclined grooves that are formed in this manner ensuring an effective drainage. This is additionally enhanced by a divided shoulder profiling, which can be provided with a plurality of rib portions as well as additional short inclined grooves.

The rune-shaped profiled elements can have a width that is at least 12 to 22 mm. These profiled elements end freely in the vicinity of the circumferential groove. The same profiled elements can also be connected with the central rib via a bridge-like connecting element that is disposed in the base of the tread design. The height of such bridge-like connecting means can be from ⅛ to ½ of the depth of the rest of the profiled elements. The transitions in these connecting ribs or bridges between the central rib and the tips or starts of the profiled elements can be chamfered or otherwise inclined, or can be embodied with some other suitable transition shape so as not to adversely affect the drainage conditions.

To ensure a relatively low central portion wear, a low shoulder portion wear, and a relatively slight development of noise, the bend regions are embodied in such a way, with regard to an effective drainage of the central region and the shoulder regions, that the distance between the bend regions over the width of the tread surface is not greater than 67% of the tire support width for wide tires having a height-to-width ratio of $\leq 0.6$. This distance between the bend regions is preferably in the range of 50 to 67% of the tire support width.

Due to the fact that the profiled elements are steeply oriented relative to the equatorial plane of the tire, similarly steeply oriented inclined grooves are formed that are provided with a relatively long linear drainage channel that is angled-off only in the shoulder regions. Therefore, to ensure an effective withdrawal of water, each profiled element is provided in the vicinity of the tire shoulders with a plurality of grooves, without this being a drawback for the profiled element support system in the shoulders. The forking of the shoulder profiling can be divided by one or more grooves that in addition end blindly in the shoulder profile. Furthermore, an additional short ri b element can be disposed between the rune-shaped profiled elements. This additional short rib element can have one or more blind-ended supplemental grooves. In this way, the shoulder profile is split into a number of further drainage channels yet has a relatively high positive fraction, which is necessary for low wear in the shoulder region.

Pursuant to a further feature of the present invention, the central rib can have respective extensions in the direction of the steeply oriented profiled elements. In this way the central circumferential rib can on the whole, or at least partially, have a narrower configuration In addition, the central portion of the two circumferential grooves formed by such a central rib is increased.

The rune-shaped profiled elements can also be divided into a plurality of partial elements. In this way, a plurality of transfer and connecting grooves for the already present inclined grooves are provided and hence contribute to an improved drainage.

Further specific features of the present invention will be described in detail subsequently.

DESCRIPTION OF THE PREFERRED EMBODIMENTS

Referring now to the drawings in detail, shown are novel tread designs for pneumatic tires of radial construction for high-speed vehicles, with the tires having a height-to-width ratio of 0.6 and less.

The tread design 1 of FIG. 1 is formed from shaped or profiled elements 2 and 3 that extend at an angle; in each half of the tread, the profiled elements 2, 3 are oriented at a relatively steep angle in the circumferential direction, with the profiled elements 2, 3 being paired in the shape of V's. With this tread design, which is tied to the direction of rotation, the direction of normal travel of the tire is designated by the letter L.

The angle $\alpha$ is 14° relative to the equatorial plane x—x. The starts or tips 2a, 3a of the profiled elements 2, 3 are disposed in the central portion of the tread design. Disposed between these tips 2a, 3a is a centrally disposed zig-zagged rib 4 that is continuous in the circumferential direction. Consequently, two circumferential grooves 5, 6 are provided in the central portion of the tread design. The inclined grooves 7, 8 formed by the profiled elements 2, 3 directly adjoin, i.e. communicate with the circumferential grooves 5, 6.

In this way, a groove system is provided that has central grooves and grooves that are steeply inclined relative to the circumferential direction, thereby ensuring an effective drainage.

At the bend regions 9, 10, the profiled elements 2, 3 are angled back in a direction toward a line that is parallel to the axis of the tire, and in particular extend at an angle $\beta$ that is 70° relative to the equatorial plane x—x. This ensures that water that is flowing off in the central and adjacent portion of the tread can rapidly flow into the open shoulder grooves. For wide tires, the arrangement of the ribbed elements 2, 3 is so steep relative to the circumferential direction of the tire, that as a consequence thereof the development or generation of noise is also relatively slight. This feature is effectively enhanced by the centrally disposed center rib 4, which can have a width of from 13 to 22 mm. The width of the inclined profiled elements is between 12 and 20 mm. The width of these profiled elements can be the same for all of the ribs. However, this width can also vary for the individual profiled elements, or can also be recurrent, for example for every other profiled element. This depends, among other things, upon the tread spacing. By providing a relatively wide center rib 4, the wear in the center of the tread can be kept to a favorably low level.

As a result of a forked and bent shoulder profiling 12, the drainage is very effective and wear in the shoulder region is relatively favorable. The shoulder forking is formed by two ribs 11 and 13 and the blind-ended grooves 14. The tire support width is designated by the letter A. The forked configuration of the tire shoulder is approximately $\frac{1}{3}$ in the tire support surface, with the remainder thereof terminating in the rounded portion of the shoulder. With wide ribs, the non-deformability of the profiled elements, especially in the central portion, is sufficient to receive the stress of millions of ground contact cycles without an appreciable rapid wear.

Figure 2:
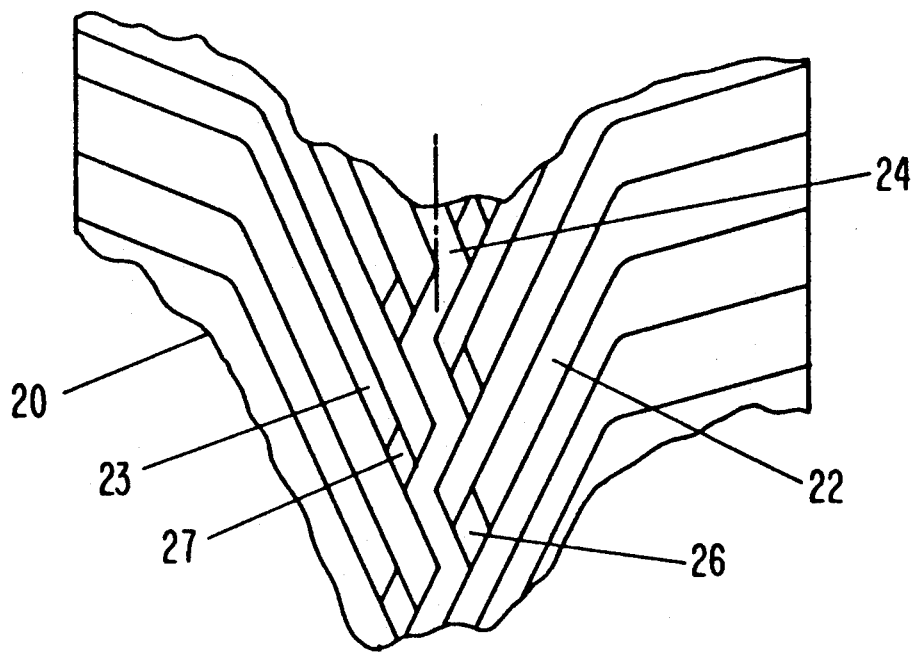
FIG. 2 shows a tread design similar to FIG. 1, with the central rib being connected by bridge elements to the profiled elements.

If the central rib 24 is narrower, as in the tread design 20 of FIG. 2, this circumferential rib 24 is then integrally connected to the tips or starts of the profiled elements 22, 23 via ribs 26, 27 that are disposed at tho base of the tread design and have approximately half the height of the remainder thereof. The ribs or bridges 26, 27 are preferably provided with transition portions that have a favorable flow configuration for the water that is received and is to flow off.

Figure 3:
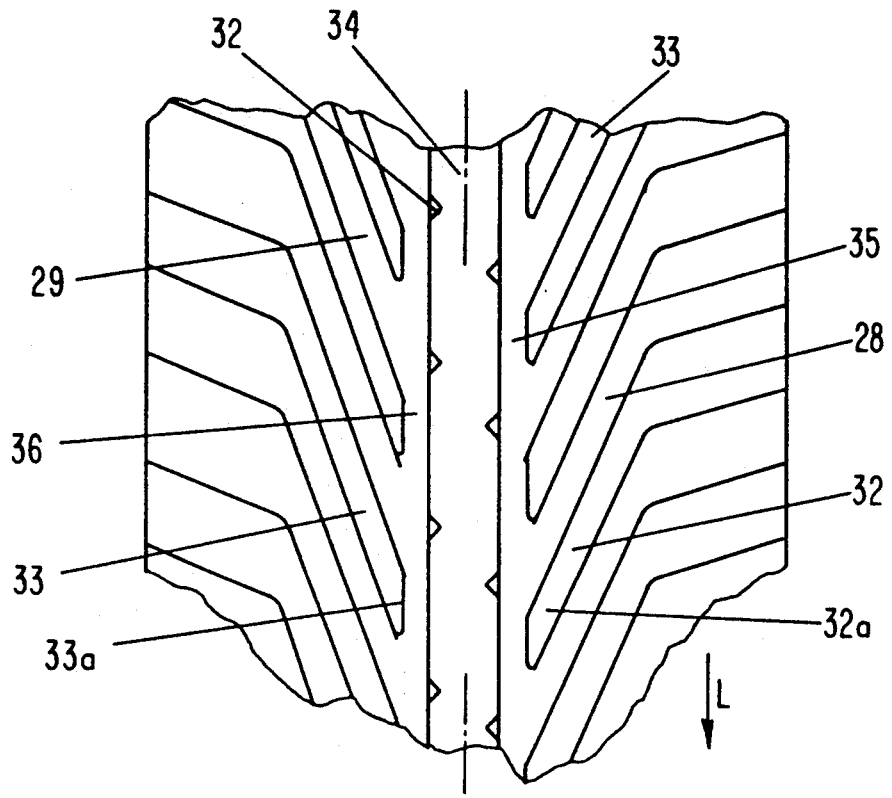
FIG. 3 shows another exemplary embodiment of an inventive tread design having a central, linear circumferential rib and profiled elements that are arranged in the shapes of V's and have a shoulder bend.

The tread design 33 of FIG. 3 comprises a central rib 34 having contours that extend parallel to the equatorial plane x—x and are spaced from the associated profiled elements 32, 33, which are oriented in the shape of V's. This embodiment has the advantage that the central circumferential grooves 35, 36 are linear and open in the circumferential direction.

The inclined grooves 28, 29 open into the linearly extending circumferential grooves 35, 36 at a steep angle and continue in the same direction continuously toward the bend region of the shoulder profiling.

Figure 4:
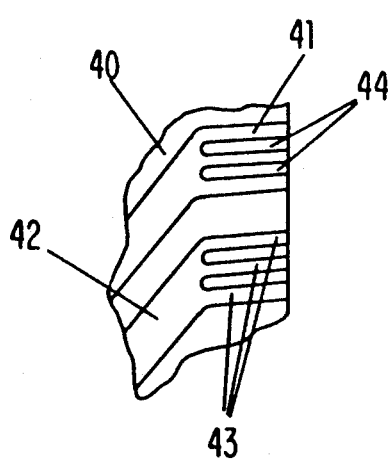
FIG. 4 shows an arrangement of profiled elements with a rib forking in the shoulder regions.

In the shoulder profiling 41 of FIG. 4, the angled-off profiled elements 42 have a forked enlargement comprising, for example, three branched-off short ribs 43 that are combined with two blind-ended grooves 44.

Figure 5:
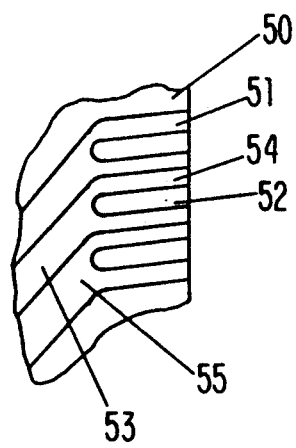
FIG. 5 shows an arrangement similar to FIG. 4 with a modified fork configuration.

In the embodiment of FIG. 5, the shoulder profiling 51 comprises an additional short rib 52, which divides the inclined groove 53 between the profiled elements 55 into two outlet grooves 54.

Figure 6:
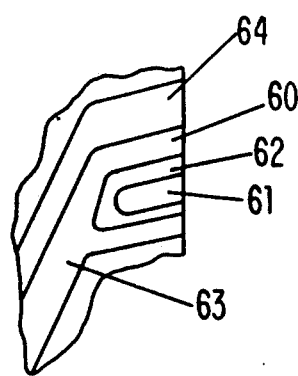
FIG. 6 is an arrangement similar to that of FIGS. 4 or 5 with a further modified fork configuration.

The shoulder profile 61 of FIG. 6 includes a U-shaped short rib 62. The angled off rib portions 64 of the profiled elements 63 extend approximately parallel to the axis of the tire, with the U-shaped ribs 62 being disposed between two such rib portions 64.

These shoulder profile embodiments are provided with various negative profile fractions, and are provided as a function of the necessity of the shoulder profiling of a wide tire, having a height-to-width ratio of 0.6 and less.

Figure 7:
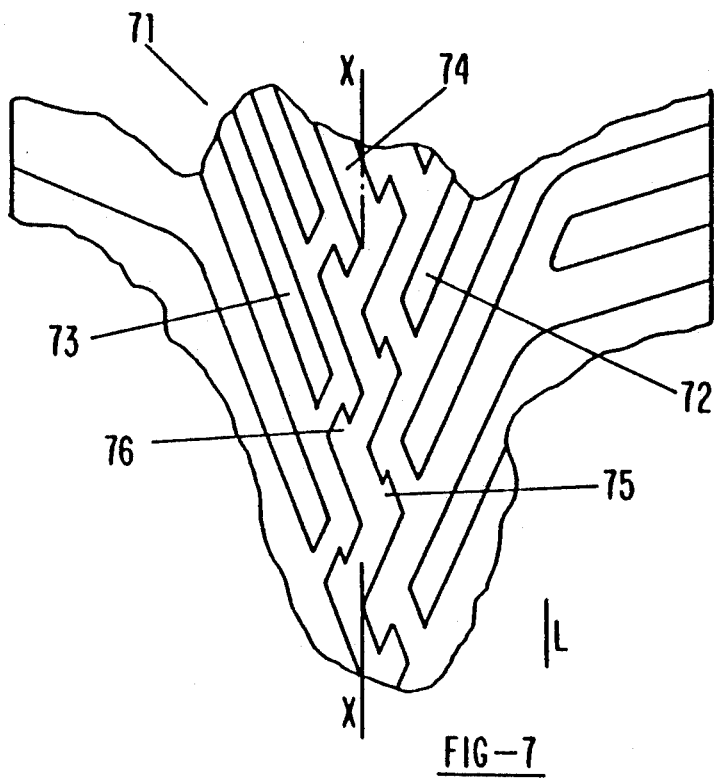
FIG. 7 shows another exemplary embodiment of an inventive tread design that is formed from a central circumferential rib having extensions, and from profiled elements that are arranged in the shape of V's.

FIG. 7 shows a tread design 71 where the central rib 74 is provided with extensions 75, 76 that are disposed in the direction of the inclined profiled elements 72, 73. This tread design has the advantage that the central rib is wider and at the same time is divided by the short recesses formed at the extensions. In this way, the circumferential grooves are displaced further in a direction toward the shoulders.

The advantages are an improved resistance to wear and an improved withdrawal of water out of the central region.

Figure 8:
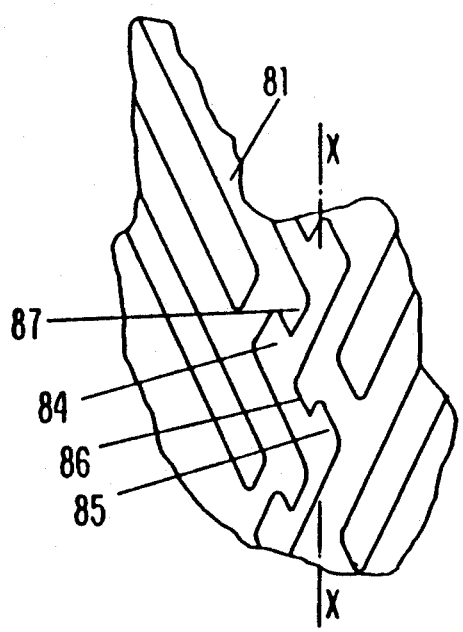
FIG. 8 is a modification of the embodiment of FIG. 7.

The embodiment of the tread design 81 shown in FIG. 8 is similar to that of FIG. 7, although in this embodiment the central rib 84 is differently divided into rib portions 85, 86, the surfaces of which vary in size. This design has the advantage that the central region achieves a still better removal of water from the central portion due to the deeper recesses 87.

Figure 9:
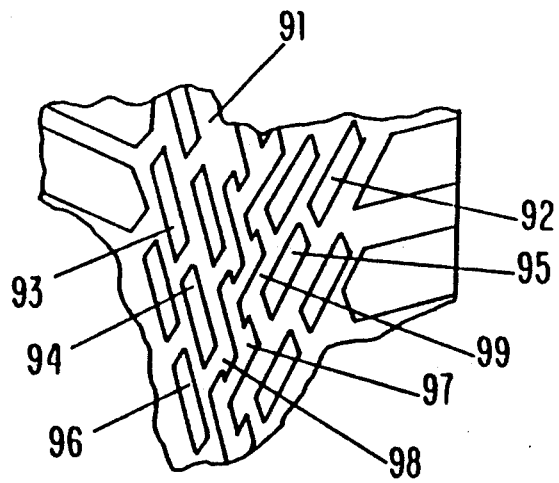
FIG. 9 shows a tread design similar to that of FIG. 8, with the profiled elements being split into partial elements.

In the embodiment of the tread design 91 illustrated in FIG. 9, the inclined profiled elements 92, 93 are divided into partial ribs 94, 95, 96, thereby providing a groove system that has additional transverse groove connections; these partial ribs are approximately three times as long as they are wide. This has the advantage that an improved accommodation and withdrawal of water is achieved, and aquaplaning is even more reliably avoided. Furthermore, the resistance to skidding on a wet surface is improved due to the presence of additional partial rib edges.

Figure 10:
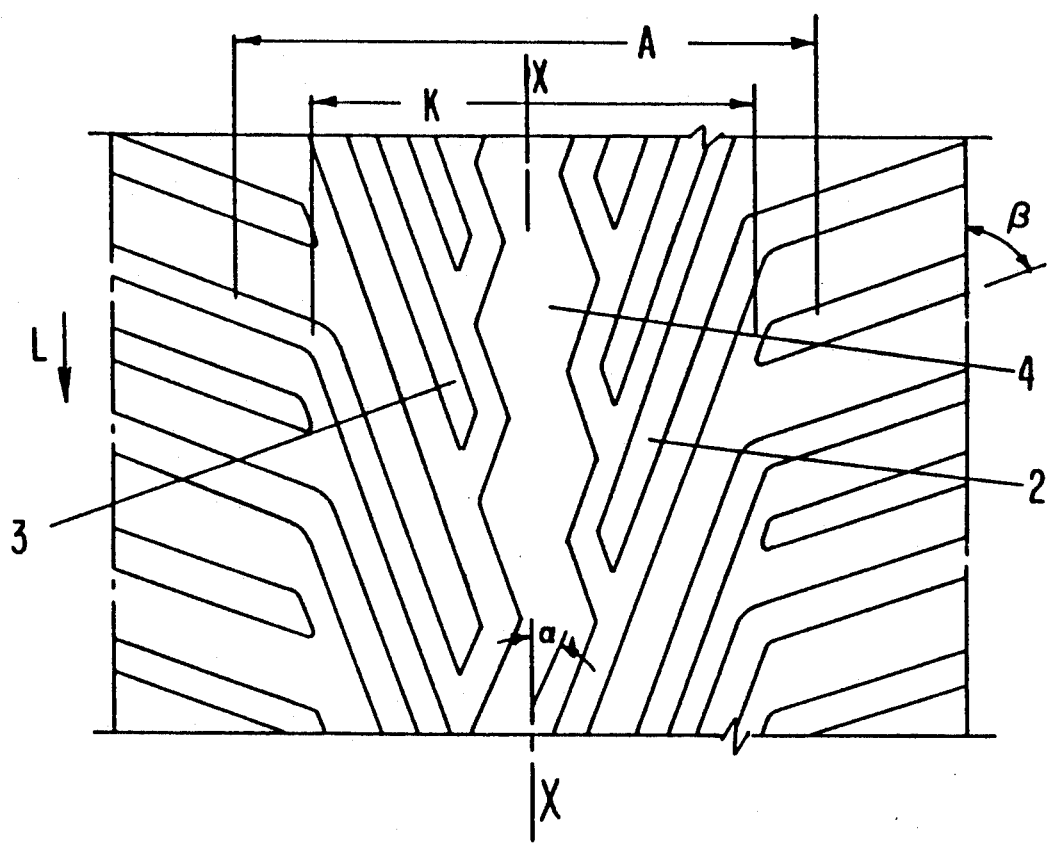
FIG. 10 shows a portion of the tread design of FIG. 1 in nearly actual size.

FIG. 10 shows a portion of the tread design 1 in nearly actual size, with the distance "k" between the bend regions 9, 10 comprising 67% of the tire support width A.

The present invention is, of course, in no way restricted to the specific disclosure of the specification and drawings, but also encompasses any modifications within the scope of the appended claims.

What we claim is:

1. In a pneumatic tire of radial construction for high-speed vehicles, with said tire having a height-to-width ratio of ≦0.6 and furthermore having a belt-reinforced tread portion with a tread design that is tied to the direction of rotation and comprises profiled elements that are steeply oriented in the circumferential direction at an angle to an equatorial plane of said tire and are arranged in the shape of V's, with said profiled elements extending from a central portion of said tread design into shoulder regions of said tire, with said profiled elements being angled-off at a respective bend region of said shoulder regions in the direction of an axis of said tire, and with respective continuous inclined grooves that proceed from the vicinity of said central portion of said tread design to said shoulder regions being formed between said profiled elements, the improvement wherein:

a continuous circumferentially extending rib is disposed in said equatorial plane of said tire and is spaced from starting portions of said profiled elements, which profiled elements are each continuous and essentially rune-shaped, so as to form two central, circumferentially extending grooves, one on each side of said circumferential rib, between said rib and said starting portions of said profiled elements, with said inclined grooves communicating with said circumferential grooves;

in said central portion of said tread design, said continuous profiled elements and inclined grooves extend linearly from said circumferential grooves at an angle of from 5° to 30° relative to said equatorial plane;

in said shoulder regions, proceeding from said bend regions, said profiled elements extend at an angle of from 65° to 85° relative to said equatorial plane; and said shoulder regions have a forked configuration, with each of said profiled elements, in said shoulder regions, having at least one blind-ended groove, and with an additional rib being respectively disposed between the forked shoulder regions of adjacent profiled elements.

2. A tread design according to claim 1, wherein said central circumferential rib has a zig-zagged configuration and said starting portions of said profiled elements are spaced at a specific yet selectable distance from said circumferential rib.

3. A tread design according to claim 1, wherein said central circumferential rib has a linear configuration and said starting portions of said profiled elements are spaced at a specific yet selectable distance from said circumferential rib.

4. A tread design according to claim 1, in which said starting portions of said profiled elements are connected to said circumferential rib via respective bridge members disposed in a base portion of said tread design.

5. A tread design according to claim 1, in which the distance between said bend regions of said shoulder regions is 50 to 67% of a tire support width.

6. A tread design according to claim 1, in which each additional rib is provided with a blind-ended groove.

7. A tread design according to claim 1, in which each of said profiled elements has the same width.

8. A tread design according to claim 1, in which the width of said profiled elements varies.

9. A tread design according to claim 2, in which said circumferential rib is provided with extensions that respectively extend at said angle of orientation at which said profiled elements extend in said central portion of said tread design.

* * * * *